Nov. 4, 1952  E. A. McCLENDON  2,616,513
PORTABLE AMINE GAS TREATER
Filed Aug. 30, 1948
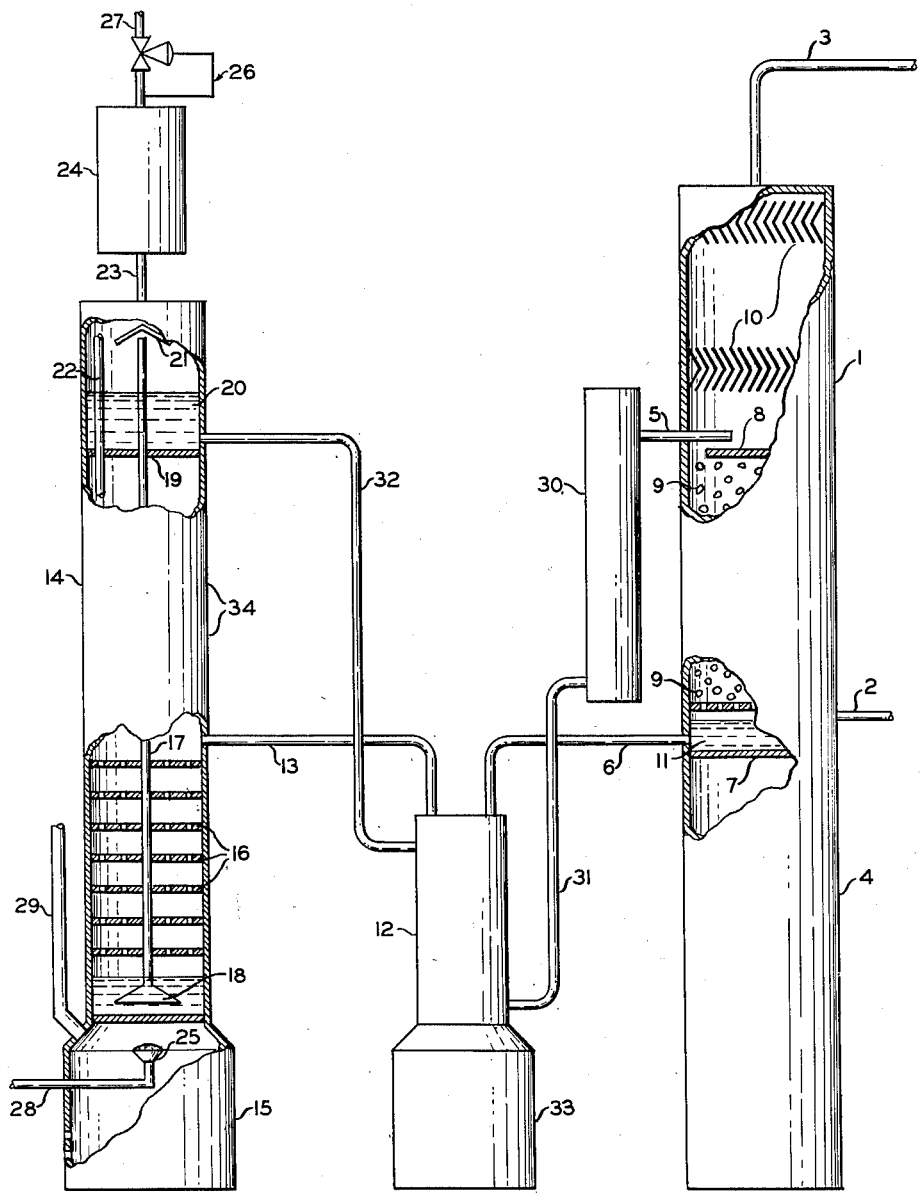
INVENTOR.
E. A. McCLENDON
BY Hudson & Young
ATTORNEYS Patented Nov. 4, 1952

2,616,513

UNITED STATES PATENT OFFICE 2,616,513

PORTABLE AMINE GAS TREATER

Ernest A. McClendon, Odessa, Tex., assignor to Phillips Petroleum Company, a corporation of Delaware Application August 30, 1948, Serial No. 46,783

3 Claims. (Cl. 183—2.5)

This invention relates to the treatment of gases. In one of its more specific aspects this invention relates to an apparatus for use in the treatment of gases and to its operation. In a still more specific aspect this invention relates to a portable apparatus wherein small volumes of gases may be treated for the removal of acidic constituents.

An object of my invention is to provide a gas treating apparatus for use in the treatment of relatively small volumes of gases. Another object of my invention is to provide a portable apparatus and a method for its operation for the treatment of small volumes of gases. Still another object of my invention is to provide a portable gas treating apparatus wherein no mechanically moving parts are required. Still another object of my invention is to provide an apparatus for the continuous treatment of small volumes of gases for the removal of acidic constituents, which apparatus may be used in outlying areas for the treatment of gases. Still other objects and advantages will be apparent upon reading the following disclosure, which, taken with the attached drawing, forms a part of this specification.

The use of aliphatic amine or other solutions for the absorption of acidic gases is known. Such amines as monoethanol amine, or mixtures of this amine with diethanol amine and/or triethanolamine are in use commercially for treatment of gases containing acidic impurities such as $CO_2$, $SO_2$ and $H_2S$.

When monoethanol amine is the absorbent amine used, it may be used as an aqueous solution containing 15 to 20% of the amine. Less concentrated or more concentrated amine solutions may be used, if desired, and as circumstances warrant.

The drawing is a diagrammatic illustration, partly in section and partly in elevation, of a preferred form of my apparatus.

Referring now to the drawing, reference numeral 1 refers to an absorber vessel and this vessel is equipped with a gas inlet tube 2 in its sidewall, and a gas outlet tube 3 in the top. The vessel is composed mainly of two parts, the upper or absorber portion and the lower or base portion. The base portion 4 is relatively high so that gravity flow of amine solution may be realized. A plate 7 at the top of this base portion 4 defines the bottom of the absorber section and upon this base plate 7 rests a quantity of amine solution. Above this solution is a contacting means 9, such as rings or fragments of material or such other material as will promote efficient contacting between the counter-currently flowing gas stream and the amine solution. The amine solution enters the absorber through a tube 5. A distributor plate 8 is adapted to distribute the solution feed over the cross-sectional area of the absorber. A mist extractor 10 is situated in the top of the absorber to eliminate loss of treating solution. The tube 6 conducts enriched amine solution from the bottom section of the absorber.

My stripper column or still 14 is likewise composed of several sections. A lower section contains perforated plates 16 adapted for permitting gases to rise up the column while allowing liquid to flow downward. This column is equipped with an inlet tube 13 adapted for introduction of rich amine solution upon the top perforated plate. A lean amine solution outlet tube 32 passes from the column 14 at a point just above the transverse plate 19 and this pipe or tube 32 leads to a heat exchanger 12. A gas or vapor tube 23 leads from the top of the column 14 to an air condenser 24. An outlet tube 27 carrying a back pressure regulator 26 is connected with the air condenser 24. In the center of the column 14 and disposed vertically is an elongated eductor tube 17. The bottom of this tube terminates as a funnel shaped opening 18 while at the top end of the tube is disposed a splash plate 21. Extending through the transverse plate 19 is a second vertical tube 22 which is adapted to permit flow of gases from the central section to the top section of the column.

Supporting this column 14 is a base 15 which also serves as a housing for a heater. A burner tube 28 is adapted to conduct gas or other fuel from a source not shown into the burner housing 15 to the burner 25. A vent pipe 29 provides for the escape of combustion gases from this burner chamber.

To the heat exchanger 12 are connected four pipes or tubes 6, 13, 31, and 32. If a U-coil heat exchanger is used, the tubes 6 and 13 may be attached to the opposite ends of the U-coil or to the tubes while the tubes 31 and 32 may be connected to the space around the coil. A base or support means 33 is provided for support of the heat exchanger 12. An air cooler 30 is inserted between tubes 31 and 5 for further cooling liquid material flowing into the absorber vessel 1.

In the operation of my apparatus, lean amine solution flows through tube 5 into the absorber vessel 1 at a point above the contact material 9. From tube 5 the solution drops upon the distributor plate 8 which is intended to distribute the incoming solution over the cross-sectional area of the contact material. This solution then flows downwardly through the packing or contacting material 9 and accumulates as the enriched amine solution 11 in the bottom of the absorption vessel section. The gas to be treated enters the absorber through the inlet pipe 2 and passes upwardly through the contacting material 9 in counter-current relation to the downflowing amine solution. Any mist or fine droplets of amine solution which are entrained by the gas undergoing treatment will be removed upon passage of the gas through the mist extractor 10. The treated gas free from mist then leaves the absorber through the outlet pipe 3 for such disposal and use as desired.

The enriched amine solution 11 which accumulates in the base of the absorber section then flows by gravity through the outlet pipe 6, through the heat exchanger 12, and on through tube 13 to the top of the uppermost perforated plate 15 in the stripper column. This flow of amine solution from the absorber to the stripper is strictly by gravity since the level of the amine solution 11 on the base plate 7 is higher than the outlet end of pipe 13 in the stripper vessel. This enriched amine solution on passing through the heat exchanger 12 becomes heated by indirect heat exchange with hot lean amine solution. After the stripper has been in operation for some time and the solution accumulating in the bottom has become heated, absorbed gas is evolved therefrom and this gas passes upward through the plate perforations and further heats the rich solution flowing downward through the plates. As this downflowing solution becomes heated some of its gas content is evolved and is carried upward through the plate perforations. The evolved gas accumulating in the central section of the stripper column passes on upward and through the tube 22 into the separator section of the column. From this section the evolved gas then passes through the gas outlet tube 23 through the air condenser 24 and through the back pressure regulator 26 to the outlet tube 27 for such disposal or use as desired. On this air condenser water vapor is condensed and liquid water returns through line 28 to the system to prevent loss of water from the amine solution.

The burner 25 for heating the enriched amine solution in the base of the stripper column is approximately centrally located with respect to the cross-section of the column and directly above the base plate of the column is the inverted conical end of the eductor tube 17. This tube 17 with its funnel shaped opening is intended to operate as a gas lift for transferring absorption solution from the bottom of the column through the tube 17 into the upper separator section of the column. The splash plate 21 is intended to deflect the flow of liquid and mist as it leaves the top of the tube 17 so that liquid will not be carried into the gas stream leaving through tube 23. However, since some vapors of amine solution may be carried with the gases through outlet tube 23, the air condenser 24 is provided for the condensation of such material as well as for the condensation of water vapor. Any condensate forming in this condenser will flow by gravity from the condenser through the tube 28 into the separator section. The amine solution 20, devoid of its absorbed gases, accumulates on the transverse plate 19 and this solution then flows by gravity through the outlet pipe 32 into the heat exchanger 12 and out through tube 31 into the air cooler 30 and through tube 5 into the absorber.

It will be noted that the inlet tube 5 to the absorber vessel is lower than the base plate 19 in the stripper column so that the lean amine solution 20 will flow by gravity from the stripper column into the absorber. It will be further noted that the enriched amine solution accumulating in the bottom of the absorber flows by gravity through line 6, the exchanger 12 and line 13 into the lower portion of the stripper column. The lean solution from the bottom of the stripper column flows by gas lift up the eductor tube 17 to the separator section and the solution as mentioned flows from this section by gravity into the absorber column. Thus there is a complete cycling of the amine solution throughout this absorber-stripper apparatus without the use of the mechanical pumps. The only transfer which is not by gravity is by gas lift and this gas lift is operated by the gas being evolved from the amine solution.

A sour natural gas may contain hydrogen sulfide and for treatment of such gas an amine solution containing 15 to 20 per cent monoethanolamine and 85 to 80 per cent water may be used. Of course, it is necessary that the treating solution possess the property of absorbing such a gas at a relatively low temperature, for example, at about atmospheric temperature, and upon heating to a higher temperature the absorption reaction must be reversed so that absorbed gas or gases may be evolved from the solution and the solution cooled and recycled. Monoethanolamine serves very well as such a treating solution for the removal of acidic gases from such gases as natural gas. Monoethanolamine or diethanolamine or a mixture of these amines by themselves or with or without some triethanolamine may be used in aqueous solution for removing acidic gases from nonacidic gases.

The back pressure regulator on the stripper gas outlet may be set for opening at a pressure slightly above the pressure at which the absorber works. This pressure differential is slight since too much pressure would interfere with gravity flow of amine solution from absorber to stripper and from stripper to absorber.

My apparatus as herein described may be used for dehydrating moisture containing gas, as for example, natural gas. In this case, ethylene glycol or other suitable liquid desiccating agent may be used. This dehydrating agent should, of course, possess the property of absorbing moisture at a relatively low temperature, as for example, atmospheric temperature, and give up the absorbed moisture at a higher temperature. The general operation of my process for dehydrating a gas is substantially the same as when operated for acidic gas removal. When used in dehydrating operations the air condenser on the stripper gas outlet may be smaller than when used in acid gas removal, since it is desirable not to condense and return moisture.

The gas purification apparatus as herein disclosed finds special utility for treatment of small volumes of sour natural gas for household purposes or for engine fuel in isolated locations where, of course, sour gas is the only gas available. The apparatus may also be used under similar conditions for treating gas for engine fuel purposes in oil well drilling operations. The apparatus may be used for treating natural gas for removal of acidic gases for any purpose whatever. Various sizes of apparatus as herein disclosed may be used, for example, the entire apparatus may be so small that it can be mounted upon a very small base and carried in hand from place to place.

The gas burner illustrated as burner 25 need not necessarily be a gas heater but may be an oil heater, an electric heater, or any other type heater may be used. The gas burner was described in connection herewith since the natural gas undergoing treatment is easily available.

The sidewall of the still 14 may, if desired, be insulated against excessive heat loss. The upper portion of the still sidewall may be left uninsulated so as to serve as an air condenser 34 for condensation of the treating solution from the desorbed vapors.

It should be understood that a small amount of water may be lost in the vapors leaving through line 27 and makeup water may need to be added from time to time to maintain the composition of the aqueous amine solution at the desired value.

The perforate plates 16 in still 14 may also be replaced with any suitable packing material. The only requirement is that a means should be provided for disengaging a gas or vapor from a liquid.

The tube 22, also, need not necessarily be disposed as illustrated in the drawing. This tube could be outside the vessel with its lower end communicating with the still below the plate 19 and its upper end communicating with the air condenser 24. I have shown and described this tube 22 as disposed within the vessel since such construction is simple.

A mixture of aliphatic amine and drying agent such as ethylene glycol in aqueous solution may be used as the treating agent in case it is desired to remove moisture as well as acidic gas from a natural gas containing these materials.

Materials of construction for my apparatus may be selected from among those commercially available. The apparatus may be constructed of materials which resist hydrogen sulfide corrosion in case the hydrogen sulfide content of the gas to be treated is relatively high.

It will be obvious to those skilled in the art that many alterations and variations in design of the apparatus herein disclosed may be made, such as those hereinabove mentioned, and yet remain within the intended spirit and scope of my invention.

Having disclosed my invention, I claim:

1. A stripping vessel comprising an elongated, vertically disposed, cylindrical vessel, a liquid-gas disengaging means in the lower portion of the vessel, a gas lift tube extending from a point near the bottom of the vessel to a point near the top thereof, a plate disposed transversely of the vessel at a point nearer the top than to the bottom and dividing said vessel into two sections, said gas lift tube extending through said plate, a second tube extending from a point below said plate to a point above said plate, a first tube connection in the sidewall of said vessel above but adjacent to the top of said liquid-gas disengaging means and below said transverse plate, a second tube connection in the sidewall of said vessel above but adjacent said transverse plate, a third tube connection in the top of said vessel and means for supplying heat to the bottom of the vessel.

2. An apparatus for stripping a gas from a liquid containing said gas comprising an elongated, vertically disposed, cylindrical vessel, a liquid-gas disengaging means in the lower portion of said vessel, a gas lift tube disposed axially and extending from a point near the bottom of said vessel to a point near the top thereof, a plate disposed transversely of the vessel at a point nearer the top thereof than to the top of said liquid-gas disengaging means and dividing said vessel into a short upper section and a long lower section, said axially disposed tube extending through said plate, a second tube extending from a point below said plate to a point above said plate, a first tube connection in the sidewall of said vessel above but adjacent the top of said liquid-gas disengaging means and below said transverse plate, a second tube connection in the sidewall of said vessel above but adjacent said transverse plate, a third tube connection in the top of said vessel, a condensing means in said third tube connection, and means for supplying heat to the bottom of said vessel.

3. The apparatus of claim 2 wherein the lower end of the first mentioned tube terminates as a funnel shaped section with the larger diameter of the funnel being nearer the bottom of said vessel, and a splash plate disposed above the upper and open end of said first mentioned tube.

ERNEST A. McCLENDON.

REFERENCES CITED

The following references are of record in the file of this patent:

UNITED STATES PATENTS

| Number | Name | Date |
|---|---|---|
| 1,464,918 | Andrews | Aug. 14, 1923 |
| 1,783,901 | Bottoms | Dec. 2, 1930 |
| 2,177,068 | Hutchinson | Oct. 24, 1939 |
| 2,180,495 | Bacon | Nov. 21, 1939 |
| 2,217,429 | Bolcar | Oct. 8, 1940 |
| 2,225,959 | Miller | Dec. 24, 1940 |
| 2,424,614 | Haun | July 29, 1947 |